(12) United States Patent
Sinclair

(10) Patent No.: US 7,080,072 B1
(45) Date of Patent: *Jul. 18, 2006

(54) ROW HASH MATCH SCAN IN A PARTITIONED DATABASE SYSTEM

(75) Inventor: Paul L. Sinclair, Manhattan Beach, CA (US)

(73) Assignee: NCR Corp., Dayton, OH (US)

( * ) Notice: Subject to any disclaimer, the term of this patent is extended or adjusted under 35 U.S.C. 154(b) by 618 days.

This patent is subject to a terminal disclaimer.

(21) Appl. No.: 09/992,523

(22) Filed: Nov. 14, 2001

(51) Int. Cl.
*G06F 17/30* (2006.01)

(52) U.S. Cl. ............ 707/6; 707/100; 707/205; 711/153

(58) Field of Classification Search .......... 707/205, 707/102, 104.1, 10, 6, 100; 711/100, 153; 709/214, 215
See application file for complete search history.

(56) References Cited

U.S. PATENT DOCUMENTS

| | | | |
|---|---|---|---|
| 5,121,494 A | 6/1992 | Dias et al. ............... 707/2 |
| 5,537,475 A | 7/1996 | Micali ................. 380/30 |
| 5,721,907 A | 2/1998 | Pyne ................. 707/10 |
| 5,765,146 A | 6/1998 | Wolf et al. ............... 707/2 |
| 5,787,411 A | 7/1998 | Groff et al. ............... 707/2 |
| 5,794,229 A * | 8/1998 | French et al. ............ 707/2 |
| 5,802,357 A * | 9/1998 | Li et al. ................. 707/2 |
| 5,835,755 A | 11/1998 | Stellwagen, Jr. ........... 707/3 |
| 5,860,070 A | 1/1999 | Tow et al. ................ 707/8 |
| 5,960,086 A | 9/1999 | Atalla ................. 380/44 |
| 6,073,129 A | 6/2000 | Levine et al. ............. 707/4 |
| 6,081,801 A | 6/2000 | Cochrane et al. .......... 707/3 |
| 6,092,061 A * | 7/2000 | Choy ................. 707/1 |
| 6,105,026 A | 8/2000 | Kruglikov et al. .......... 707/8 |
| 6,112,198 A | 8/2000 | Lohman et al. ........... 707/3 |
| 6,115,705 A | 9/2000 | Larson ................. 707/3 |
| 6,216,125 B1 * | 4/2001 | Johnson ................ 707/4 |
| 6,223,182 B1 | 4/2001 | Agarwal et al. ......... 707/102 |
| 6,240,428 B1 | 5/2001 | Yeung et al. .......... 707/208 |

(Continued)

OTHER PUBLICATIONS

Goetz Graefe; "Query Evaluation Techniques for Large Databases" ACM Computing Surveys, vol. 25, No. 2, Jun. 1993; Portland State University, Computer Science Department, P. O. Box 751, Portland, Oregon 97207-0751.

*Primary Examiner*—Leslie Wong
*Assistant Examiner*—Susan Rayyan
(74) *Attorney, Agent, or Firm*—Baker Botts; John D. Cowart

(57) ABSTRACT

A database system for selecting rows from a partitioned database table is disclosed. The partitioned database table includes rows and columns and is divided into partitions with at least one of the partitions in the table being populated by one or more rows. The system includes one or more nodes, each of the one or more nodes providing access to one or more CPUs. Each of the one or more CPUs provides access to one or more virtual processes. Each process is configured to manage data, including the partitioned database table, stored in one of a plurality of data-storage facilities. The system also includes a partitioned table access component configured to select rows from the table by creating a file context, which stores at least location data for a row and a first value associated with the row, for each populated partition, determining the lowest first value stored by the file contexts, and identifying rows with a particular first value by reading the file contexts.

25 Claims, 7 Drawing Sheets

U.S. PATENT DOCUMENTS

| | | | |
|---|---|---|---|
| 6,263,331 B1 | 7/2001 | Liu et al. | 707/4 |
| 6,341,281 B1 * | 1/2002 | MacNicol et al. | 707/3 |
| 6,349,310 B1 * | 2/2002 | Klein et al. | 707/200 |
| 6,366,902 B1 * | 4/2002 | Lyle et al. | 707/2 |
| 6,366,911 B1 * | 4/2002 | Christy | 707/7 |
| 6,370,529 B1 | 4/2002 | Kruglikov et al. | 707/8 |
| 6,401,098 B1 | 6/2002 | Moulin | 707/102 |
| 6,421,662 B1 | 7/2002 | Karten | 707/3 |
| 6,493,699 B1 | 12/2002 | Colby et al. | 707/2 |
| 6,496,817 B1 * | 12/2002 | Whang et al. | 707/2 |
| 6,505,188 B1 * | 1/2003 | Ghazal et al. | 707/2 |
| 6,567,802 B1 | 5/2003 | Popa et al. | 707/3 |
| 6,594,659 B1 * | 7/2003 | Lin et al. | 707/7 |
| 6,609,131 B1 | 8/2003 | Zait et al. | 707/102 |
| 6,662,175 B1 | 12/2003 | Ghazal et al. | 707/2 |
| 6,678,701 B1 | 1/2004 | Garth et al. | 707/201 |
| 6,772,163 B1 * | 8/2004 | Sinclair et al. | 707/100 |
| 2002/0016922 A1 | 2/2002 | Richards et al. | 725/750 |
| 2002/0065815 A1 | 5/2002 | Layden | 707/3 |
| 2002/0099691 A1 | 7/2002 | Lore et al. | 707/2 |
| 2002/0165727 A1 | 11/2002 | Greene et al. | 705/1 |
| 2002/0194157 A1 | 12/2002 | Zait et al. | 707/2 |

* cited by examiner

ROW HASH MATCH SCAN IN A PARTITIONED DATABASE SYSTEM

BACKGROUND

Data organization is important in relational database systems that deal with complex queries against large volumes of data. Relational database systems allow data to be stored in tables that are organized as both a set of columns and a set of rows. Standard commands are used to define the columns and rows of tables and data is subsequently entered in accordance with the defined structure. The defined table structure is logically maintained, but may not correspond to the physical organization of the data. For example, the data corresponding to a particular table may be split up among a number of physical hardware storage facilities.

Users of relational database systems require the minimum time possible for execution of complex queries against large amounts of data. Different physical types of storage, for example random access memory and hard drives, incur different length delays. In addition, writing to memory or a hard drive is often slower than reading an equivalent amount of data from memory or a hard drive. The organization of data corresponding to tables defined in a relational database system may determine the number of writes and reads that need to be performed in order to execute a common query. If the data is properly organized, performance can be improved by searching a part of the data for queries that can take advantage of that organization. If the data is not organized in any way, it will often need to be searched in its entirety to satisfy a query or copied and restructured into a useful organization.

Given a particular change in the organization of data, particular types of searches may be adversely impacted in terms of efficiency if they are performed without any adjustment. Many factors must be addressed to adjust a search type that is to be performed with respect to a new organization of data. Such factors include but are not limited to the manner in which the data is stored, the file system that identifies the location of the data and various other information about the data, and the desired outcome of the search. Failure to consider and address any one of those factors can result in an inefficient search.

SUMMARY

In general, in one aspect, the invention features a database system for selecting rows from a partitioned database table. The partitioned database table includes rows and columns and is divided into partitions with at least one of the partitions in the table being populated by one or more rows. The system includes one or more nodes, each of the one or more nodes providing access to one or more CPUs. Each of the one or more CPUs provides access to one or more virtual processes. Each process is configured to manage data, including the partitioned database table, stored in one of a plurality of data-storage facilities. The system also includes a partitioned table access component configured to select rows from the table by creating a file context, which stores at least location data for a row and a first value associated with the row, for each populated partition, determining the lowest first value stored by the file contexts, and identifying rows with a particular first value by reading the file contexts.

In another aspect the invention features a method for selecting rows from a partitioned database table. The method includes creating a file context, which stores at least location data for a row and a first value associated with the row, for each populated partition of the partitioned database table. The method also includes determining the lowest first value stored by the file contexts and identifying rows with a particular first value by reading the file contexts. In a more specific implementation, the method includes updating each file context to store location data and the first value for a row in the associated partition with a first value equal to or greater than a desired first value.

In another aspect the invention features a computer program, stored in a tangible medium, for selecting rows from a partitioned database table. The program includes executable instructions that cause a computer to create a file context, which stores at least location data for a row and a first value associated with the row, for each populated partition of the partitioned database table. The instructions also cause the computer to determine the lowest first value stored by the file contexts and identify rows with a particular first value by reading the file contexts.

Other features and advantages will become apparent from the description and claims that follow.

DETAILED DESCRIPTION

Figure 1:
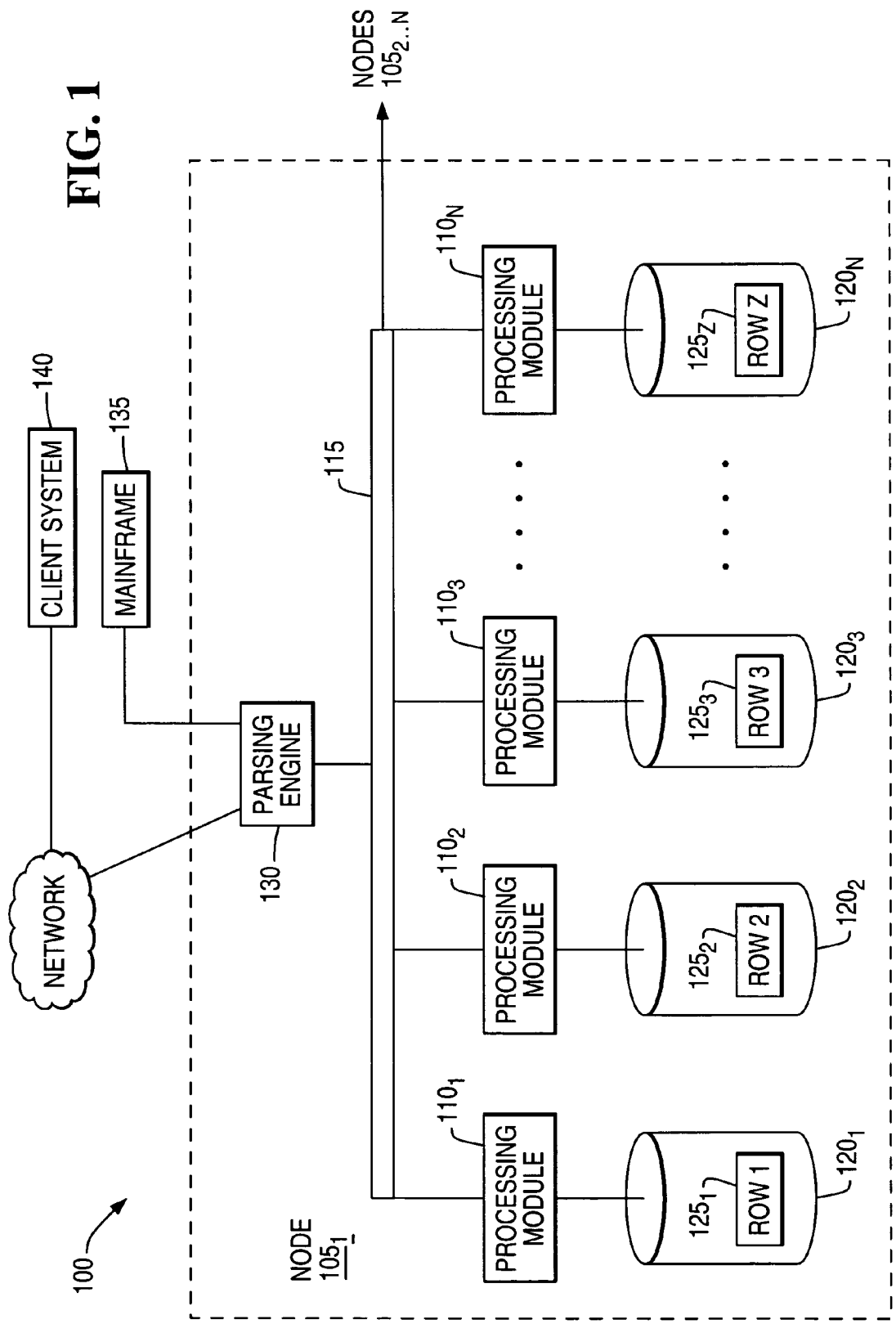
FIG. 1 is a block diagram of a node of a database system.

The partitioned table storage technique disclosed herein has particular application, but is not limited, to large databases that might contain many millions or billions of records managed by a database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1...N}$ includes one or more disk drives. The DBS may include multiple nodes $105_{2...N}$ in addition to the illustrated node $105_1$, connected by extending the network 115.

The system stores data in one or more tables in the data-storage facilities $120_{1...N}$. The rows $125_{1...Z}$ of the tables are stored across multiple data-storage facilities $120_{1...N}$ to ensure that the system workload is distributed evenly across the processing modules $110_{1...N}$. A parsing engine 130 organizes the storage of data and the distribution of table rows $125_{1...Z}$ among the processing modules $110_{1...N}$. The parsing engine 130 also coordinates the retrieval of data from the data-storage facilities $120_{1...N}$ in response to queries received from a user at a mainframe 135 or a client computer 140. The DBS 100 usually receives queries and commands to build tables in a standard format, such as SQL.

The rows $125_{1...Z}$ are distributed across the data-storage facilities $120_{1...N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_{1...N}$ and associated processing modules $110_{1...N}$ by a hash bucket map. The characteristics of the columns chosen for the primary index determine how evenly the rows are distributed.

Figure 2:
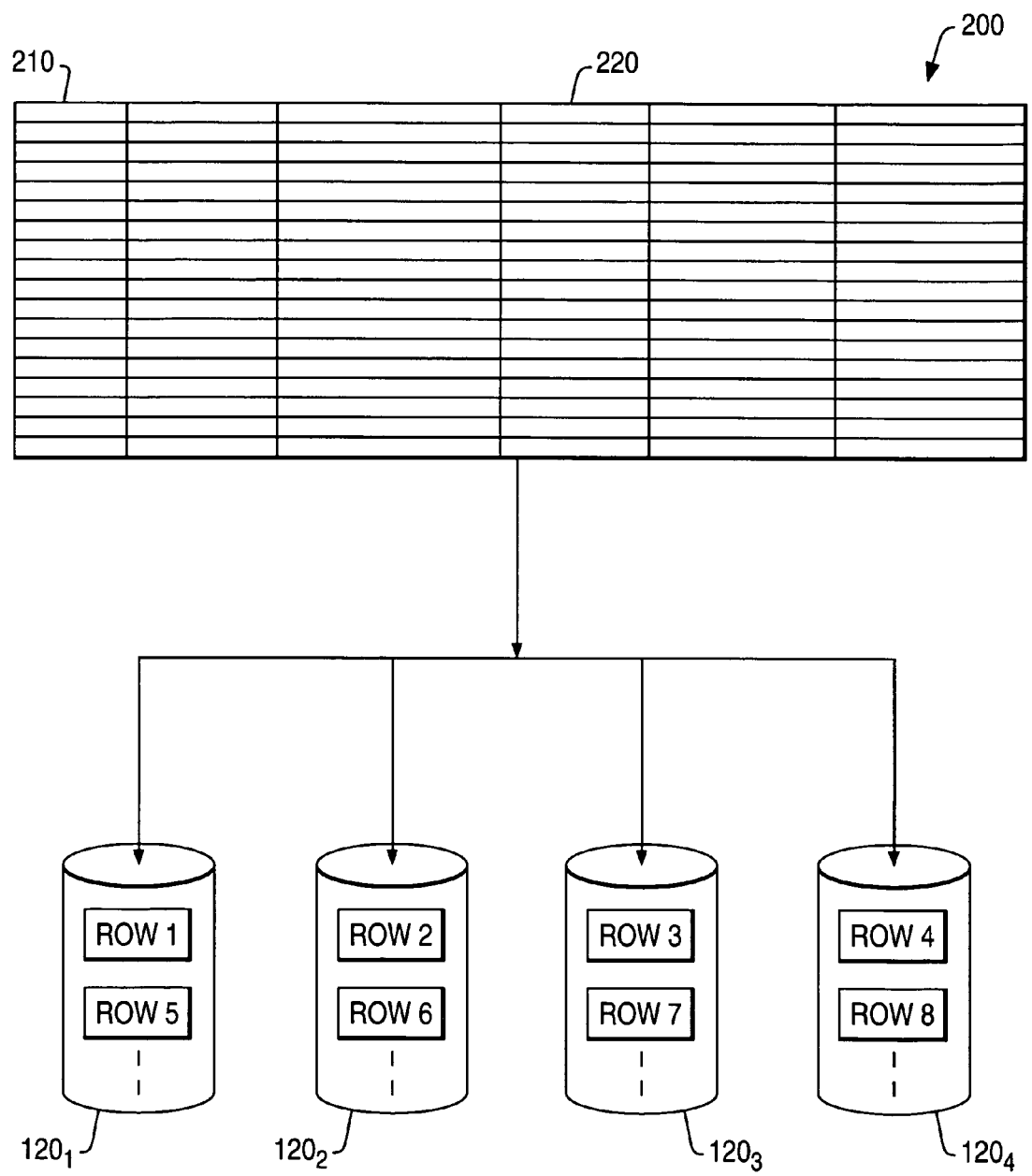
FIG. 2 is a flow diagram of a table distribution process.

FIG. 2 shows one implementation of how the rows of a table are distributed. The table 200 contains a plurality of rows and is stored in a plurality of data storage facilities $120_{1-4}$ by the parsing engine 130, shown in FIG. 1. For example, two columns 210, 220 can be designated as the primary index when the table is created. The hash function is then applied to the contents of columns 210, 220 for each row. The hash bucket portion of the resulting hash value is mapped to one of the data storage facilities $120_{1-4}$ and the row is stored in that facility. For example, if the primary index indicates a column containing a sequential row number and the hash function is the sum of the value one and the remainder when the sequential row number is divided by four, the first eight rows will be distributed as shown in FIG. 2.

Queries involving the values of columns in the primary index can be efficiently executed because the processing module $110_n$ having access to the data storage facility $120_n$ that contains the row can be immediately determined. For example, referring to FIG. 2, if values from row 2 are desired, the parsing engine 130 can apply the hashing function to determine that only processing module $110_2$ needs to be used. As another example, an equality join between two tables that have the same primary index columns is more efficient. All of the rows that need to be joined are found in the same data storage facility $120_n$ and no movement of information from rows between the data storage facilities is necessary.

Figure 3:
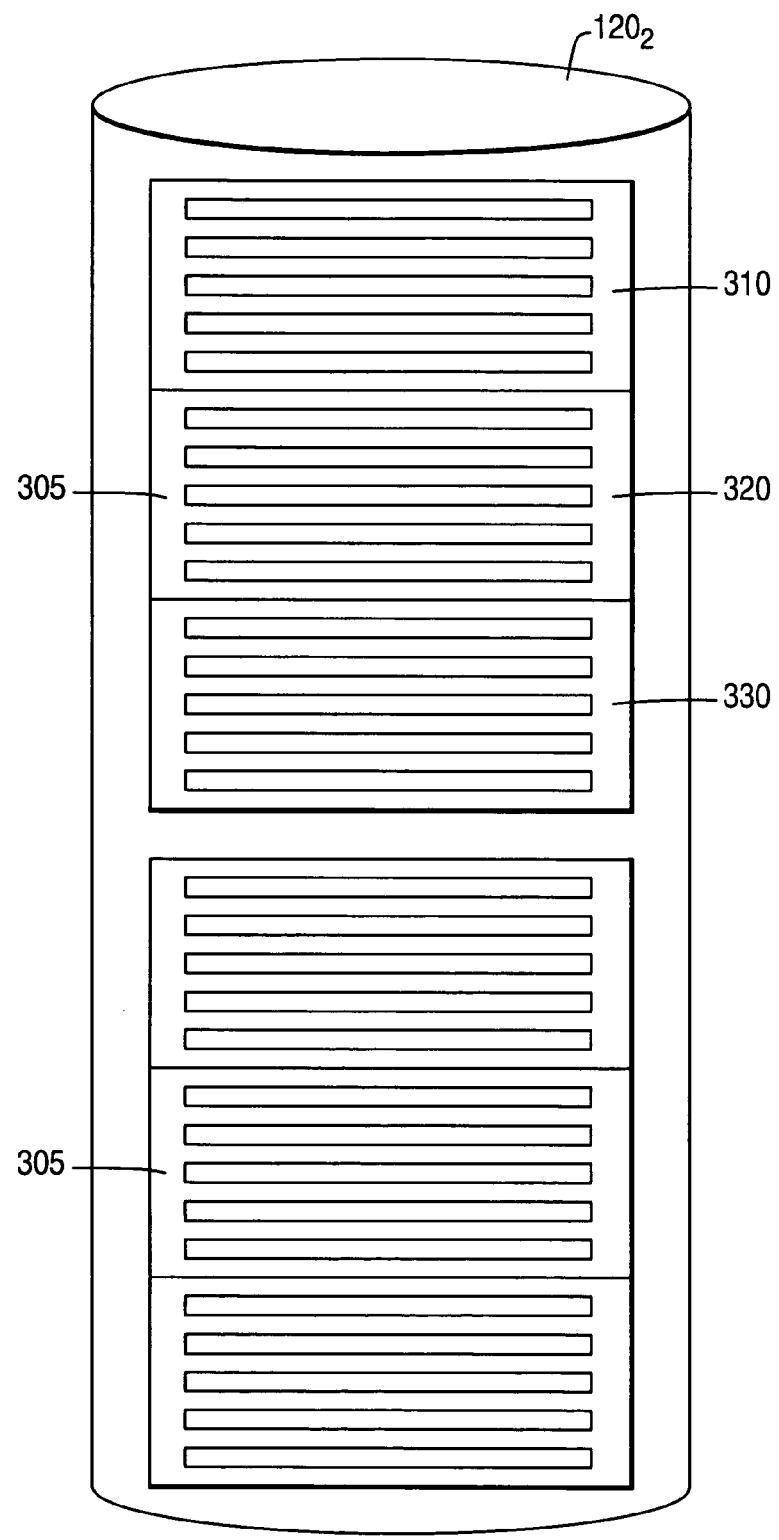
FIG. 3 illustrates an example of rows from two partitioned tables residing in a data storage facility.

While the primary index of a table can be chosen for equality joins, for example the order number column of an order table, additional design features can make range searches, for example a range of dates from the date column, more efficient. Referring to FIG. 3, a partitioned database storage facility $120_2$ is shown. Rows from two partitioned tables 305 and 340 are organized within the storage facility $120_2$ in accordance with a row identification (row ID) that can include values associated with a partition function as well as values associated with the hash function and a uniqueness value. The rows stored in the storage facility $120_2$ are ordered at a top level by the result of the partition function. As a result, a first group of rows 310 has one partition function value. A second group of rows 320 has another partition function value. A third group of rows 330 has a third partition value. The groups 310, 320, 330 are ordered by their partition values and are also known as partitions.

The rows are also ordered within each partition. For example, the first partition 310 contains five rows. Those rows are stored within that partition 310 in the order of the hash result for each row. The hash result therefore acts as a sorting or ordering value. A uniqueness value is also maintained for each row. In one implementation, no two rows with the same partition and hash value in a table can have the same uniqueness value. The uniqueness values are determined when the rows are added to the table. For example, a sequential number (the next uniqueness number after the highest one currently being used) or any currently unused number can be used as the uniqueness value. If two rows are in the same partition and have the same hash value, their order is determined by their uniqueness values, which by definition cannot be identical. The uniqueness value does not play a role in ordering rows that have different partition or hash values. In another implementation, uniqueness values are not assigned to the rows and the order of rows with identical hash values is not determined.

A partition function can return a number for a row based on the range of values into which that row's value in a certain column falls. For example, if an order table in a database has the order number column as that table's primary index, the partition function can correspond to the month of the order date. In that situation, the rows of the order table would be distributed to storage facilities based on the result of applying the hash function to the order number. In each storage facility, the rows would be ordered based on a monthly range of dates. For example, the first partition 310 could include all rows for orders in January 2001. The second partition 320 could include all rows for orders in February 2001. Within each partition the rows are in the order of the hash value and, where hash values are the same, in order by uniqueness value. Such a partitioned table could be efficiently searched on ranges by eliminating partitions from the required search. For example, if all orders for a certain product during a two month period is desired, only two partitions would need to be checked for the specified product. The monthly range is just one example of a possible partition function. Any type of function can be used.

For one implementation of joining two tables or other data structures in a DBS 100, rows to be joined are (1) within the same data storage facility and (2) organized and processed by the associated processing module such that they can be matched in accordance with whatever conditions are specified by the join command, i.e., the join conditions. When one of the join conditions is on the one or more primary index columns, the hash result of which is used to distribute rows among storage facilities, the first condition is satisfied. With regard to the second condition, if the rows are sorted in hash order in each storage facility, the rows can easily be matched in order. When one of the join conditions is on the one or more primary index columns, rows with the same hash value from one table or data structure can only potentially match with rows with the same hash value from the other table or data structure, because identical primary index column values result in identical hash values. Identical hash values, however, do not necessarily indicate identical primary index column values, because more than one primary index column value can result in the same hash value. Such primary index column values are sometimes referred to as hash synonyms. A row hash match scan method skips over rows from one table that do not have rows with corresponding hash values in the other table. For example, if on average there are 4 rows with the same hash in each table, for each row in one table the join conditions will only need to be evaluated for the 4 rows in the other table with the same hash instead of all the rows in the other table.

In one implementation of a DBS table with a partitioned primary index, the rows in each storage facility are divided up into partitions and ordered by hash within each partition. As a result, rows with the same hash value may be in different partitions rather than together as they would be if they were ordered only by hash. One option for executing a join command specifying a condition on the primary index columns in such a table is to copy the table rows and sort the copy by hash so that the row hash match scan method can be performed on the sorted copy. For a nonpartitioned table that has a primary index on the join columns, this extra copying and sorting is unnecessary and the join can take place directly from the table.

Figure 4:
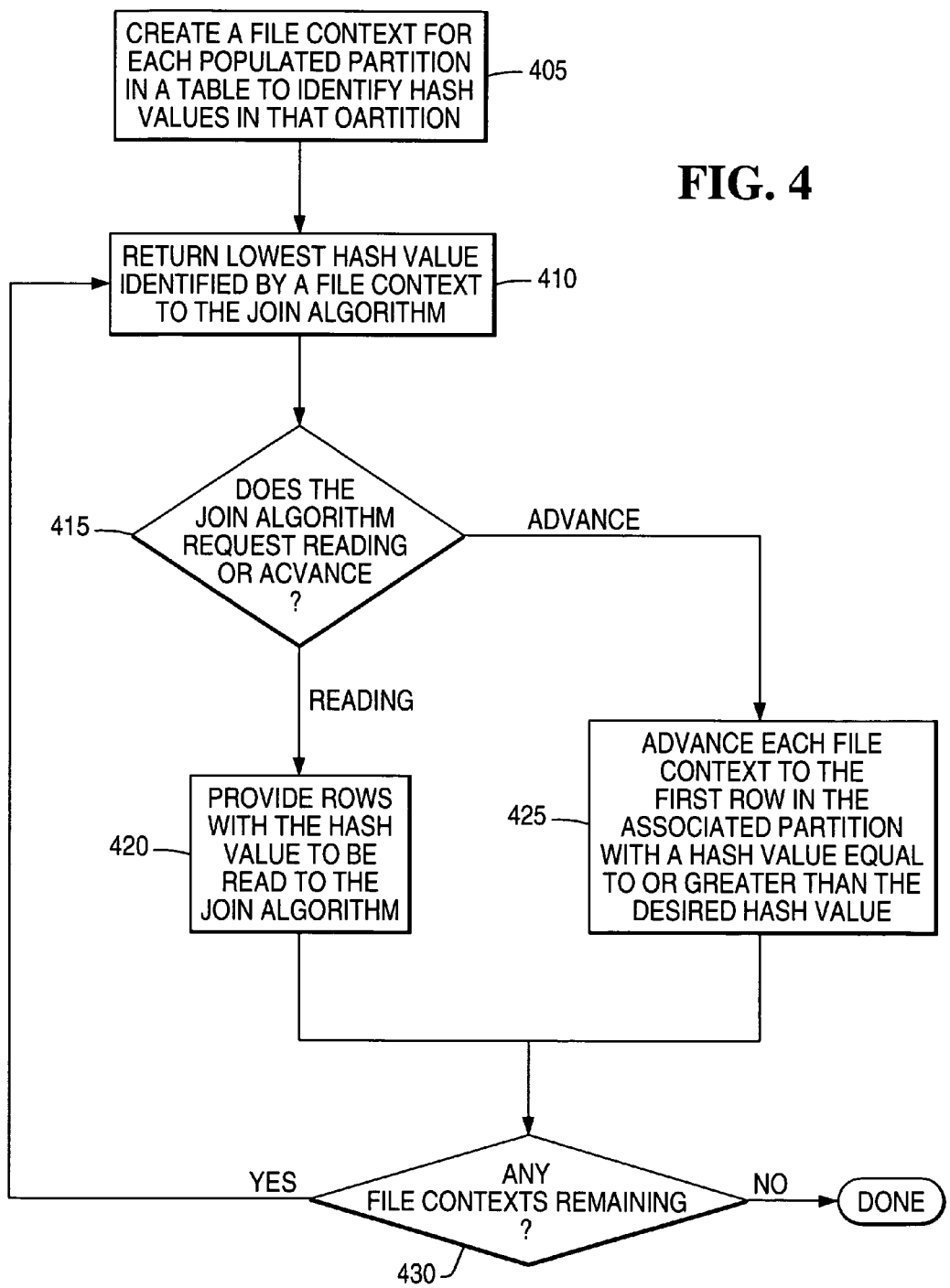
FIG. 4 is a flow chart of an algorithm for selecting rows from a partitioned table.

As depicted in FIG. 4, one implementation of a process for selecting rows by hash value from a partitioned database table for a row hash match scan algorithm includes several steps. If a partitioned table and a nonpartitioned table are joined, the process can be used on the partitioned table. If two partitioned tables are being joined, the process can be used on both tables. First, the process creates a file context for each populated partition in the one or more partitioned tables specified in the join command to track hash values in that partition 405 (more particularly described with respect to FIG. 5). The process then determines the lowest hash value identified by the file contexts for the table and provides that value to the join algorithm 410. The join algorithm requests a reading of a hash value or an advance to a hash value 415. If the join algorithm requests a reading, rows in the partitioned table with that hash value are provided to the algorithm 420 (more particularly described with respect to FIG. 6). If the join algorithm requests an advance, each file context for the partitioned table is modified, if necessary, to identify the first row with the desired hash value or a greater hash value 425 (more particularly described with respect to FIG. 7). If file contexts remain 430, the lowest identified hash value is again provided to the join algorithm 410. If no file contexts remain 430, the process of selecting rows is finished. In one implementation, the join algorithm receives a signal indicating that the partitioned table has no rows with hash values equal to or greater than the last requested hash value.

Figure 5:
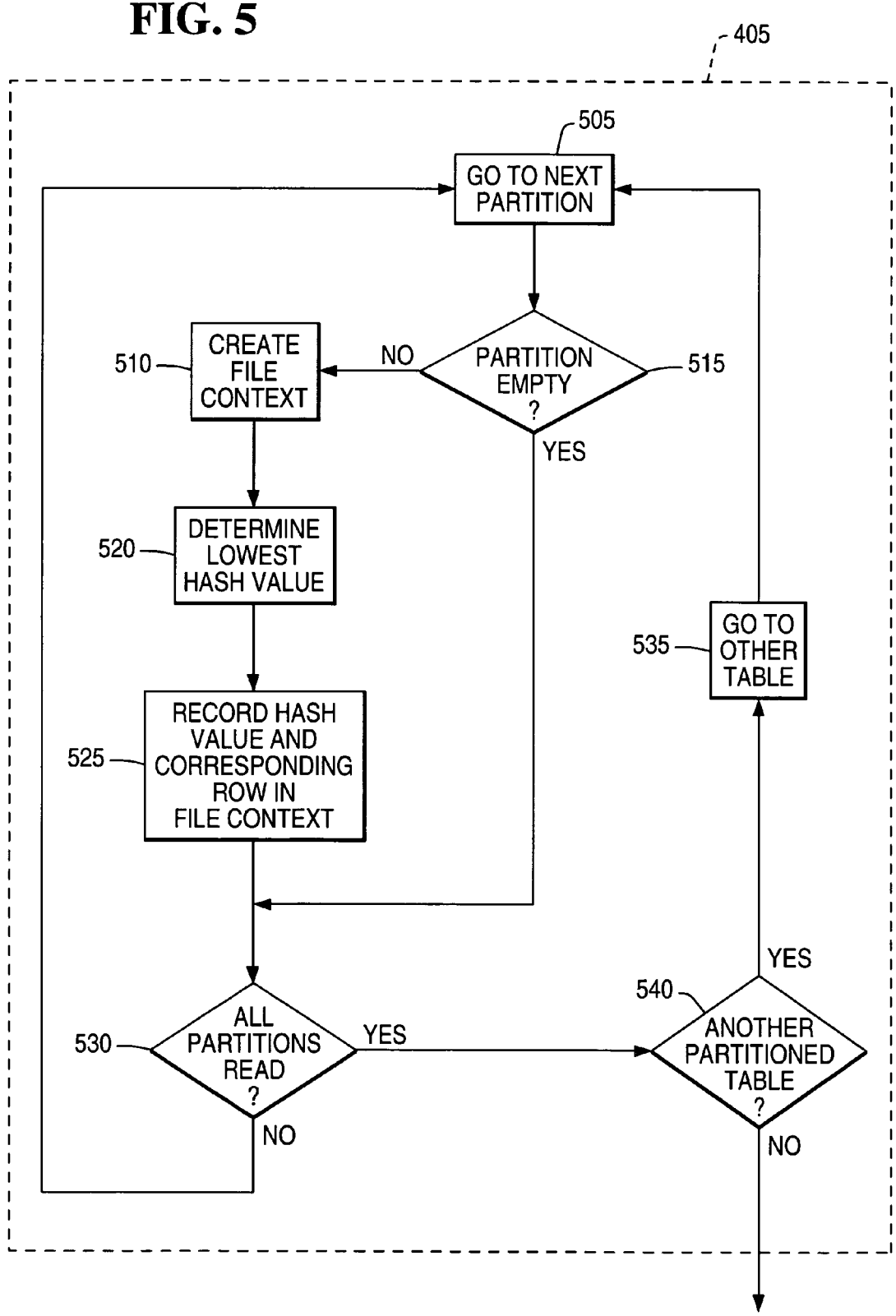
FIG. 5 is a flow chart of an algorithm for creating a file context for each populated partition in one or more tables.

One implementation of the process of creating file contexts for populated partitions is depicted in FIG. 5 and involves examining the next partition (or the first partition at the very beginning of the process) in a partitioned table 505. If that partition is empty 515 and unexamined partitions still exist in the table 530, the next partition is checked to see if it contains rows 515. If that partition is populated with one or more rows 515, an empty file context for that partition is created 510. The associated partition is then examined to find the row containing that partition's lowest hash value or, in another implementation, to find the row containing that partition's lowest hash value greater than or equal to a given hash value 520. Once a value meeting those criteria is found in a row in the partition, location information for that row, as well as the hash value itself, are stored in that partition's file context 525. In one implementation, the file context is not created until the initial location data and hash value for it are determined. If unexamined partitions still exist in the table 540, the next partition is examined 505, and the process is repeated. If all partitions in the table have been examined and another table specified in the join command is a partitioned table, the partitions in the next table are examined 535. When all partitions in all specified, partitioned tables have been examined, the process of creating file contexts is complete.

In one specific implementation, the process of creating file contexts entails, first, an empty file context is created and the file system is requested to find a first data block with a hash value equal to or higher than 'hhhhhhhh' (hexadecimal notation) ignoring one or more high-order bytes that designate the partition. The value 'hhhhhhhh' is the desired starting hash value or '00000000' if it is desired to find the first hash value in the table. The join algorithm picks one of the two tables/spools in the join and finds its lowest hash value; then using that hash value, probes into the other table/spool. The file system positions to the first data block containing a row with equal or higher hash value than the desired hash value, reads that data block and then positions to the first row in that data block with an equal or higher value than the desired hash value. Another empty file context is created. The file system is requested to find the next row using that file context with a hash value equal to or higher than 'hhhhhhhh' in a partition that is at least one higher than the partition number in the row identification (row ID) of the first row found. This is continued until no row is found creating as many file contexts as needed in the process. The file contexts are linked together so that the file contexts can easily be traversed. If, in a specific implementation, the number of partitions is limited to at most 256, no more than 256 file contexts are created.

Referring again to FIG. 4, the lowest hash value of the new file contexts for a partitioned table is determined. In one implementation of this step, the hash value in the first file context for the partitioned table is examined and stored as the "lowest" hash value. Then, the hash value in the next file context for that table is examined, and if this new value is smaller than the "lowest" hash value, the new value is stored as the "lowest" hash value. That step is repeated until every file context has been examined, at which point the "lowest" hash value has been determined.

Figure 6:
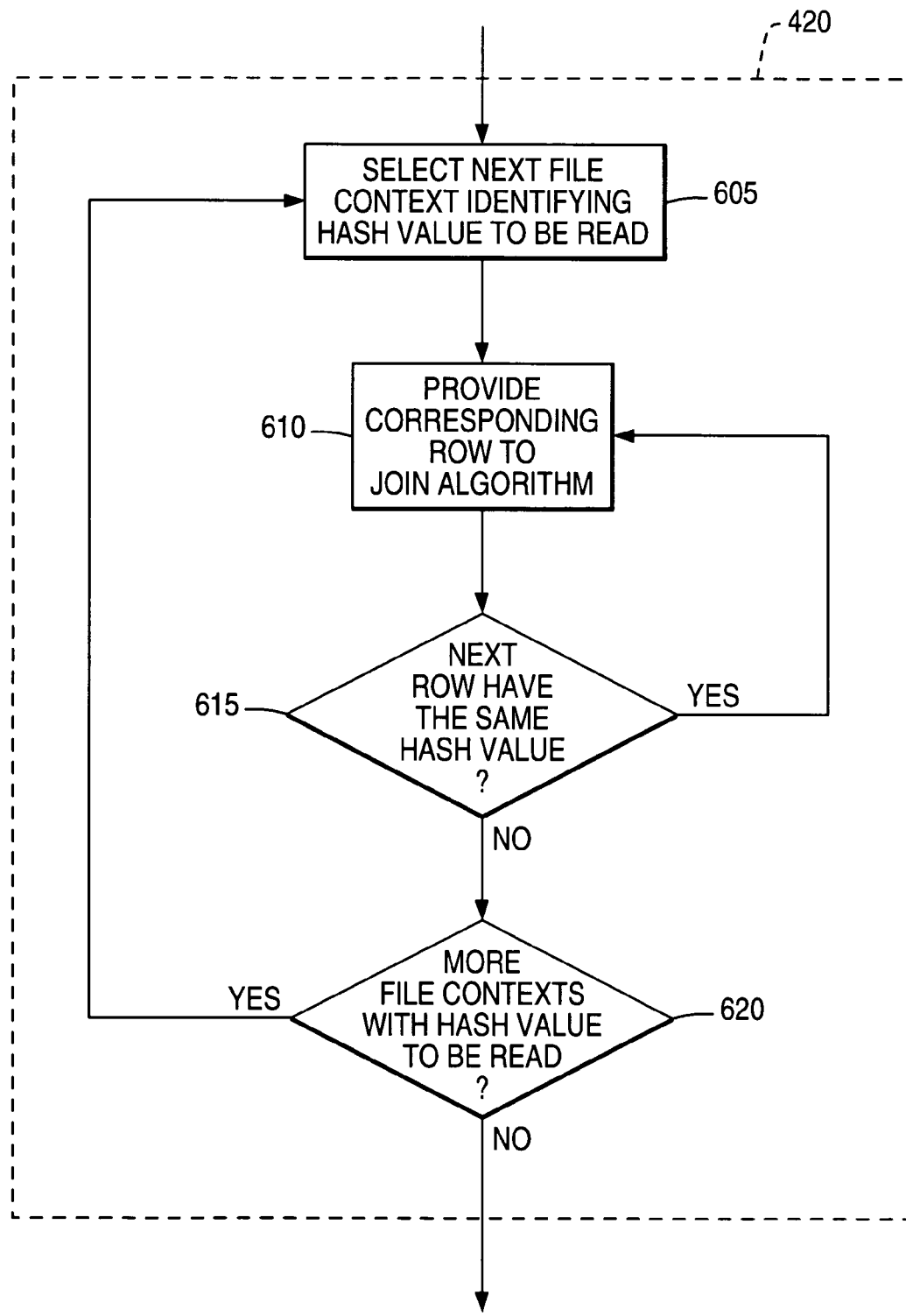
FIG. 6 is a flow chart of an algorithm for providing rows with a particular hash value.

As depicted in FIG. 4, the join algorithm can request that rows having a particular hash value be read from a partitioned table. One implementation for reading rows is depicted in FIG. 6 and begins with selecting the next partition (or the first partition at the very beginning of the process) that identifies the hash value to be read 605. The stored location data is used to provide the row data to the join algorithm 610. The next row in the partition is then checked to see if it has the same hash value 615. If it does, its data is also provided to the join algorithm. Those two steps continue until a row with a different hash value is located or no more rows are in the partition. If more file contexts identifying the hash value to be read remain 620, rows are provided using the data in those file contexts 605. If not, all the rows have been provided. In one case, the join algorithm can request that rows with the same hash value be read again. For example, insufficient available memory requires that if there are many rows with the same hash value, they are compared piecemeal with rows loaded into memory in partial sets.

Figure 7:
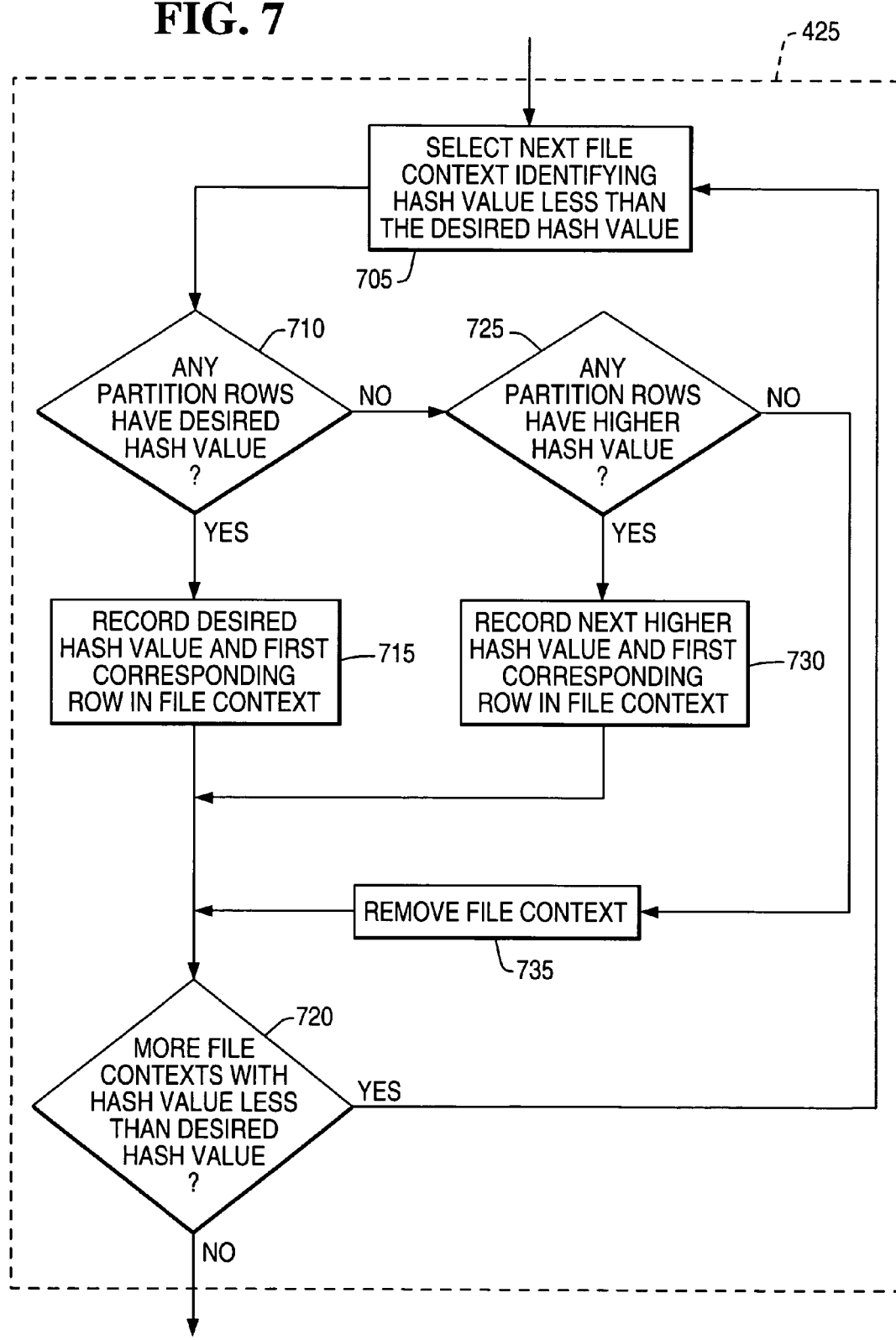
FIG. 7 is a flow chart of an algorithm for advancing the file contexts.

FIG. 7 depicts one implementation of the process of advancing each file context to the first row in the associated partition that has a hash value greater than or equal to a desired hash value 425. The implementation begins with selecting the next partition (or the first partition at the very beginning of the process) that identifies a hash value less than the desired value 705. If a partition identifies a hash value greater than or equal to the desired hash value, it does not need to be advanced, though in some implementations it could be (for instance, if residual conditions indicate that the found row is not applicable). Once a file context with a lesser hash value is identified, the rows in the associated partition are examined for the desired hash value 710. If one or more such rows exist, the hash value and location data for the first such row is recorded in the file context 715. If not, the rows in the associated partition are examined for a hash value greater than the desired hash value 725. If one or more such rows exist, the hash value and location data for the first such row is recorded in the file context 730. If no rows with hash values greater than or equal to the desired hash value are present in the partition, the file context is removed 735. The remaining file contexts are then examined for identified hash values less than the desired hash value 720 and the process repeats for any such file contexts.

In one implementation, the above-described algorithm for selecting rows from a partitioned table for use by a join algorithm can be used whenever a database system function, not necessarily a join algorithm, needs to access rows of a partitioned table in hash value order. The database system function can request rows as though the table was ordered only by hash value and the algorithm will use file contexts to deliver the rows appropriately. Thus, for example, a join command specifying two tables can invoke a join algorithm that will operate equivalently without regard to whether none, one, or both tables are partitioned. While the above implementations discuss the use of hash values, in alternate implementations other values associated with the various rows can be used.

The text above described one or more specific implementations of a broader invention. The invention also is carried out in a variety of alternative implementations and thus is not limited to those described here. For example, while the invention has been described here in terms of a DBMS that uses a massively parallel processing (MPP) architecture, other types of database systems, including those that use a symmetric multiprocessing (SMP) architecture, are also useful in carrying out the invention. As another example, an implementation has been described with the sorting value as a hash value that is also used for distributing rows among storage facilities. Other types of sorting values are also useful in carrying out the invention. Many other implementations are also within the scope of the following claims.

I claim:

1. A method for selecting rows from a partitioned database table, comprising the steps of:
   a. creating a file context, which stores at least location data for a row and a first value associated with the row, for each populated partition of the partitioned database table;
   b. determining the lowest first value stored by the file contexts; and
   c. identifying rows with a particular first value by reading the file contexts where step a comprises the steps of:
      i. creating an empty file context for a populated partition;
      ii. finding the lowest first value associated with a row in that partition;
      iii. storing the location data and the first value for the row having the lowest first value in the file context for that partition; and
      iv. repeating steps i–iii until file contexts have been created for all populated partitions.

2. The method of claim 1, where rows are ordered within the populated partitions in accordance with the first value for each row.

3. The method of claim 1, where the first values stored are based at least in part on values in one or more specified columns of the associated rows.

4. The method of claim 3, where the first values stored by the file contexts are the result of a hash function applied to values in one or more specified columns of the associated rows.

5. The method of claim 1, where step c comprises the steps of:
   i. examining file contexts in order of the populated partitions until a file context storing the particular first value is selected;
   ii. reading the location data for the row;
   iii. reading the row data;
   iv. if there is at least one additional row in the partition, comparing the first value for the next row in the partition to the particular first value;
   v. repeating steps ii–iv if the first value for the next row equals the particular first value; and
   vi. repeating steps i–v until all file contexts for the table have been examined.

6. The method of claim 1, further comprising the step of:
   d. updating each file context to store location data and the first value for a row in the associated partition with a first value equal to or greater than a desired first value.

7. The method of claim 6, where updating each file context comprises:
   i. examining file contexts in order of the populated partitions until a file context storing a first value less than the desired first value is selected;
   ii. if the partition corresponding to the selected file context contains at least one row having the desired first value, storing the location data and first value for the first such row in the file context;
   iii. if the partition corresponding to the selected file context contains no row having the desired first value and at least one row having a first value greater than the desired first value, storing the location data and first value for the first such row in the file context;
   iv. if the partition corresponding to the selected file context contains no row having the desired first value and no row having a first value greater than the desired first value, removing the file context; and
   v. repeating steps i–iv until all file contexts for the table have been examined.

8. A database system for selecting rows from a partitioned database table, the partitioned database table including rows and columns and being divided into partitions and at least one of the partitions in the table being populated by one or more rows, the system comprising:
   one or more nodes;
   a plurality of CPUs, each of the one or more nodes providing access to one or more CPUs;
   a plurality of processes, each of the one or more CPUs providing access to one or more virtual processes;
   each process configured to manage data, including the partitioned database table, stored in one of a plurality of data-storage facilities;
   a partitioned table access component configured to select rows from the table by:

a. creating a file context, which stores at least location data for a row and a first value associated with the row, for each populated partition;
b. determining the lowest first value stored by the file contexts; and
c. identifying rows with a particular first value by reading the file contexts where step a comprises the steps of:
   i. creating an empty file context for a populated partition;
   ii. finding the lowest first value associated with a row in that partition;
   iii. storing the location data and the first value for the row having the lowest first value in the file context for that partition; and
   iv. repeating steps i–iii until file contexts have been created for all populated partitions.

9. The system of claim 8, where the rows of the table are stored across at least two of the data-storage facilities and are partitioned within each data-storage facility.

10. The system of claim 8, where rows are ordered within the populated partitions in accordance with the first value for each row.

11. The system of claim 8, where the first values stored are based at least in part on values in one or more specified columns of the associated rows.

12. The system of claim 8, where the first values stored by the file contexts are the result of a hash function applied to values in one or more specified columns of the associated rows.

13. The system of claim 8, where step c comprises the steps of:
   i. examining file contexts in order of the populated partitions until a file context storing the particular first value is selected;
   ii. reading the location data for the row;
   iii. reading the row data;
   iv. if there is at least one additional row in the partition, comparing the first value for the next row in the partition to the particular first value;
   v. repeating steps ii–iv if the first value for the next row equals the particular first value; and
   vi. repeating steps i–v until all file contexts for the table have been examined.

14. The system of claim 8, where the partitioned table access component is configured to select rows from the table by updating each file context to store location data and the first value for a row in the associated partition with a first value equal to or greater than a desired first value.

15. The system of claim 14, where updating each file context comprises:
   i. examining file contexts in order of the populated partitions until a file context storing a first value less than the desired first value is selected;
   ii. if the partition corresponding to the selected file context contains at least one row having the desired first value, storing the location data and first value for the first such row in the file context;
   iii. if the partition corresponding to the selected file context contains no row having the desired first value and at least one row having a first value greater than the desired first value, storing the location data and first value for the first such row in the file context;
   iv. if the partition corresponding to the selected file context contains no row having the desired first value and no row having a first value greater than the desired first value, removing the file context; and
   v. repeating steps i–iv until all file contexts for the table have been examined.

16. A computer program, stored in a tangible medium, for selecting rows from a partitioned database table, the program comprising executable instructions that cause a computer to:
a. create a file context, which stores at least location data for a row and a first value associated with the row, for each populated partition of the partitioned database table;
b. determine the lowest first value stored by the file contexts; and
c. identify rows with a particular first value by reading the file contexts where step a comprises:
   i. creating an empty file context for a populated partition;
   ii. finding the lowest first value associated with a row in that partition;
   iii. storing the location data and the first value for the row having the lowest first value in the file context for that partition; and
   iv. repeating steps i–iii until file contexts have been created for all populated partitions.

17. The computer program of claim 16, where rows are ordered within the populated partitions in accordance with the first value for each row.

18. The computer program of claim 16, where the first values stored are based at least in part on values in one or more specified columns of the associated rows.

19. The computer program of claim 16, where the first values stored by the file contexts are the result of a hash function applied to values in one or more specified columns of the associated rows.

20. The computer program of claim 16, where step c comprises:
   i. examining file contexts in order of the populated partitions until a file context storing the particular first value is selected;
   ii. reading the location data for the row;
   iii. reading the row data;
   iv. if there is at least one additional row in the partition, comparing the first value for the next row in the partition to the particular first value;
   v. repeating steps ii–iv if the first value for the next row equals the particular first value; and
   vi. repeating steps i–v until all file contexts for the table have been examined.

21. The computer program of claim 16, further comprising executable instructions that cause a computer to:
d. update each file context to store location data and the first value for a row in the associated partition with a first value equal to or greater than a desired first value.

22. The computer program of claim 21, where step d comprises:
   i. examining file contexts in order of the populated partitions until a file context storing a first value less than the desired first value is selected;
   ii. if the partition corresponding to the selected file context contains at least one row having the desired first value, storing the location data and first value for the first such row in the file context;
   iii. if the partition corresponding to the selected file context contains no row having the desired first value and at least one row having a first value greater than the desired first value, storing the location data and first value for the first such row in the file context;

iv. if the partition corresponding to the selected file context contains no row having the desired first value and no row having a first value greater than the desired first value, removing the file context; and v. repeating steps i–iv until all file contexts for the table have been examined.

23. A method for selecting rows from a partitioned database table, comprising the steps of:

a. creating a file context, which stores at least location data for a row and a first value associated with the row, for each populated partition of the partitioned database table;

b. determining the lowest first value stored by the file contexts;

c. identifying rows with a particular first value by reading the file contexts; and d. updating each file context to store location data and the first value for a row in the associated partition with a first value equal to or greater than a desired first value, where updating each file context comprises:

i. examining file contexts in order of the populated partitions until a file context storing a first value less than the desired first value is selected;

ii. if the partition corresponding to the selected file context contains at least one row having the desired first value, storing the location data and first value for the first such row in the file context;

iii. if the partition corresponding to the selected file context contains no row having the desired first value and at least one row having a first value greater than the desired first value, storing the location data and first value for the first such row in the file context;

iv. if the partition corresponding to the selected file context contains no row having the desired first value and no row having a first value greater than the desired first value, removing the file context; and v. repeating steps i–iv until all file contexts for the table have been examined.

24. A database system for selecting rows from a partitioned database table, the partitioned database table including rows and columns and being divided into partitions and at least one of the partitions in the table being populated by one or more rows, the system comprising:

one or more nodes;

a plurality of CPUs, each of the one or more nodes providing access to one or more CPUs;

a plurality of processes, each of the one or more CPUs providing access to one or more virtual processes; each process configured to manage data, including the partitioned database table, stored in one of a plurality of data-storage facilities; and a partitioned table access component configured to select rows from the table by:

a. creating a file context, which stores at least location data for a row and a first value associated with the row, for each populated partition;

b. determining the lowest first value stored by the file contexts; and c. identifying rows with a particular first value by reading the file contexts;

where the partitioned table access component is configured to select rows from the table by updating each file context to store location data and the first value for a row in the associated partition with a first value equal to or greater than a desired first value; and where updating each file context comprises:

i. examining file contexts in order of the populated partitions until a file context storing a first value less than the desired first value is selected;

ii. if the partition corresponding to the selected file context contains at least one row having the desired first value, storing the location data and first value for the first such row in the file context;

iii. if the partition corresponding to the selected file context contains no row having the desired first value and at least one row having a first value greater than the desired first value, storing the location data and first value for the first such row in the file context;

iv. if the partition corresponding to the selected file context contains no row having the desired first value and no row having a first value greater than the desired first value, removing the file context; and v. repeating steps i–iv until all file contexts for the table have been examined.

25. A computer program, stored in a tangible medium, for selecting rows from a partitioned database table, the program comprising executable instructions that cause a computer to:

a. create a file context, which stores at least location data for a row and a first value associated with the row, for each populated partition of the partitioned database table;

b. determine the lowest first value stored by the file contexts;

c. identify rows with a particular first value by reading the file contexts; and d. update each file context to store location data and the first value for a row in the associated partition with a first value equal to or greater than a desired first value; where step d comprises:

i. examining file contexts in order of the populated partitions until a file context storing a first value less than the desired first value is selected;

ii. if the partition corresponding to the selected file context contains at least one row having the desired first value, storing the location data and first value for the first such row in the file context;

iii. if the partition corresponding to the selected file context contains no row having the desired first value and at least one row having a first value greater than the desired first value, storing the location data and first value for the first such row in the file context;

iv. if the partition corresponding to the selected file context contains no row having the desired first value and no row having a first value greater than the desired first value, removing the file context; and v. repeating steps i–iv until all file contexts for the table have been examined.

* * * * *